(12) United States Patent
Vignotto et al.

(10) Patent No.: US 7,497,629 B2
(45) Date of Patent: Mar. 3, 2009

(54) SEALING DEVICE FOR A ROLLING CONTACT BEARING

(75) Inventors: Angelo Vignotto, Turin (IT); Claudio Savarese, Airasca (IT); Alfredo Monetti, Pinerolo (IT)

(73) Assignee: Aktiebolaget SKF, Gothenburg (SE)

( * ) Notice: Subject to any disclaimer, the term of this patent is extended or adjusted under 35 U.S.C. 154(b) by 271 days.

(21) Appl. No.: 11/403,456

(22) Filed: Apr. 13, 2006

(65) Prior Publication Data
US 2007/0014499 A1    Jan. 18, 2007

(51) Int. Cl.
*F16C 32/00*    (2006.01)
(52) U.S. Cl. .................................... 384/448
(58) Field of Classification Search ............... 384/448; 324/173, 174, 207.25; 277/549, 571, 572
See application file for complete search history.

(56) References Cited

U.S. PATENT DOCUMENTS 7,318,589 B2 * 1/2008 Kageyama et al. .......... 384/448

FOREIGN PATENT DOCUMENTS

| DE | 196 36 173 A1 | 3/1998 |
|----|---------------|--------|
| EP | 1 329 728 A2  | 7/2003 |
| EP | 1 452 752 A2  | 1/2004 |
| EP | 1 447 240 A2  | 8/2004 |

\* cited by examiner

*Primary Examiner*—Thomas R Hannon
(74) *Attorney, Agent, or Firm*—Merchant & Gould P.C.

(57) ABSTRACT

Sealing device (1) for rolling contact bearings provided with a shield (2) which may be installed onto an outer race (11) of the bearing (12), and presenting a lateral cylindrical wall (21) which is suitable for being arranged in a radially intermediate position between an encoder (16) and a reading sensor (17) of the bearing (12), and a passing window (29) which is obtained through the lateral cylindrical wall (21) in order to permit the sensor (17) to face the encoder (16); a cover (40) made of plastic material being arranged in such a way as to close the window (29), and being selectively mobile in order to effect variations in pressure between the inside and outside of the bearing (12) between two extreme operating positions in at least one of which the cover (40) is suitable for substantially sealing the window (29).

7 Claims, 2 Drawing Sheets

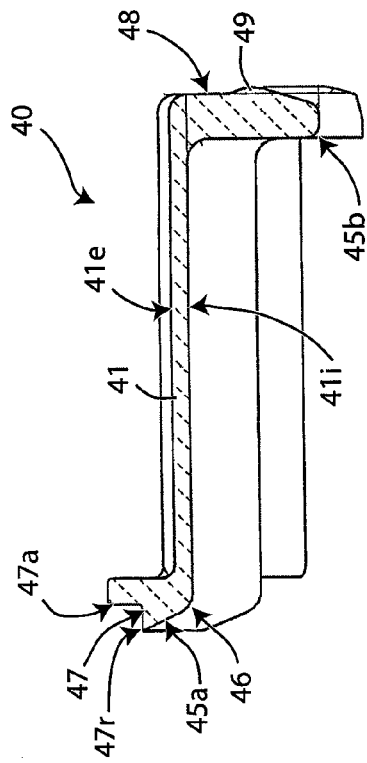
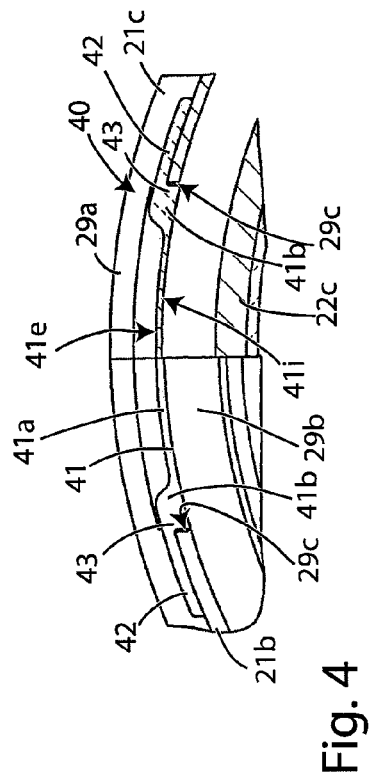
Fig. 3
Fig. 4
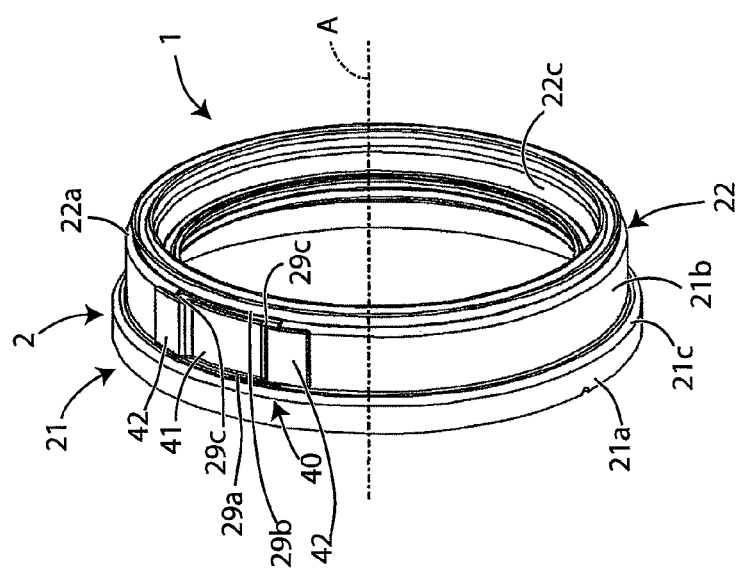
Fig. 1

SEALING DEVICE FOR A ROLLING CONTACT BEARING

BACKGROUND OF THE INVENTION

The present invention relates to a sealing device for rolling bearings.

In particular, the present invention may be advantageously applied in the field of rolling contact bearings which are provided with a device for reading functioning kinematic parameters and which is defined by a rotating encoder and a fixed sensor which faces the encoder.

In the above application, and as is schematically illustrated in FIG. 5 labelled "Prior Art", sealing devices of a well known type comprise a shield 10 which is made of metallic material and which may be installed onto an outer race 11 of the bearing 12, and a sealing lip 13, which starts from the shield 10 in order to be arranged in such a way as to abut an inner race 14 of the bearing 12 itself.

The shield 10 comprises, in turn, a cylindrical lateral wall 15 which is radially interposed between the encoder 16 and the sensor 17, and a frontal shaped wall 18, which is integral with the lateral cylindrical wall 15, and which axially folds inside the lateral cylindrical wall 15 itself in order to further protect the encoder 16, and support the sealing lip 13.

In the above-described sealing devices, with the aim of reducing to a minimum any possible interference concerning the reading of the sensor 17 due to thickness of the lateral cylindrical wall 15 and also due to the metallic material of which it is made, the lateral cylindrical wall 15 presents a passing window 19, which is partially engaged by the sensor 17, and is sealed by a sealing membrane 20 which is made of rubber material.

The membrane 20 is suitable for substantially entering in contact with the sensor 17, and is part of a coating 20' made of rubber material which is arranged in such a way as to completely cover the shield, and which is made in a single piece with the sealing lip 13.

As is well known, sealing devices protect rolling bearings against the infiltration of impurities, and they also prevent the escape of any lubricating grease from inside the bearings themselves, and they are also subject to dynamic stress due to the difference in pressure between the inside and the outside of the bearings which is caused by the assembly of the bearings, as well as by temperature changes during the functioning of the bearings.

This dynamic stress acts above all on the sealing membrane, which consequently becomes weakened over time, and which, in a worst case scenario, may tear and cause lubricating grease to escape from inside the bearing and thus reduce the bearing's useful working life.

SUMMARY OF THE INVENTION

The aim of the present invention is to produce a sealing device for rolling contact bearings which will be free of the above-described disadvantages.

According to the present invention, a sealing device for rolling contact bearings will be produced, comprising:

a shield which may be installed onto an outer race of the bearing, and presenting a lateral cylindrical wall which is suitable for being arranged in an intermediate position between an encoder and a reading sensor of the bearing; and a passing window which is obtained through the lateral cylindrical wall in order to permit the sensor to face the encoder;

the sealing device being characterised by the fact that it comprises a cover, which is arranged in such a way as to close the window, and which is selectively mobile in order to effect variations in pressure between the inside and the outside of the bearing between two extreme operating positions in at least one of which the cover is suitable for substantially sealing the window.

BRIEF DESCRIPTION OF THE DRAWINGS

The present invention will now be described with reference to the attached drawings, which illustrate a non-limiting form of embodiment of the present invention, and in which:

FIG. 1 is a perspective view of a preferred form of embodiment of a sealing device for rolling contact bearings according to the present invention;

FIG. 3 illustrates, in axial section and on an enlarged scale, a detail which is shown in FIG. 2; and FIG. 4 is an axial semi-section on an enlarged scale of a detail which is shown in FIG. 1.

DETAILED DESCRIPTION OF THE PREFERRED EMBODIMENT(S)

Figure 5:
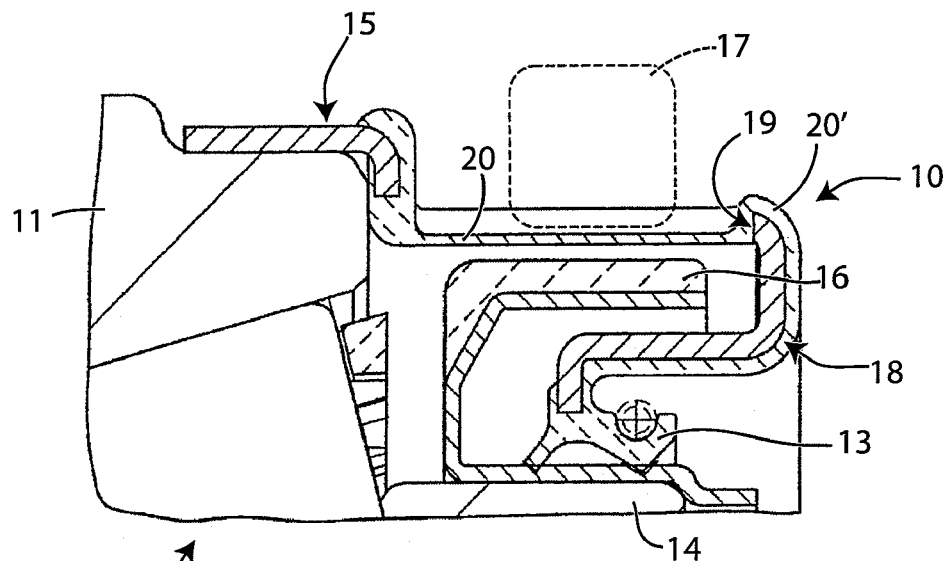
FIG. 5 is an axial section view of a prior art bearing.

With initial reference to FIG. 1, and using the same reference numbers in order to designate the same or similar parts which have already been described in the introductory part of this description, the number 1 indicates in its entirety a sealing device for a rolling contact bearing 12.

The device 1 presents a central axis A, and is arranged between the two races 11 and 14 in order to protect the bearing 12 from the infiltration of impurities, and to prevent any eventual escape of lubricating grease from the inside of the bearing 12 itself, and comprises a shield 2 which is made of metallic material and which may be installed on the outer race 11, and two sealing elements 13a and 13b which are integral with the shield 2.

Figure 2:
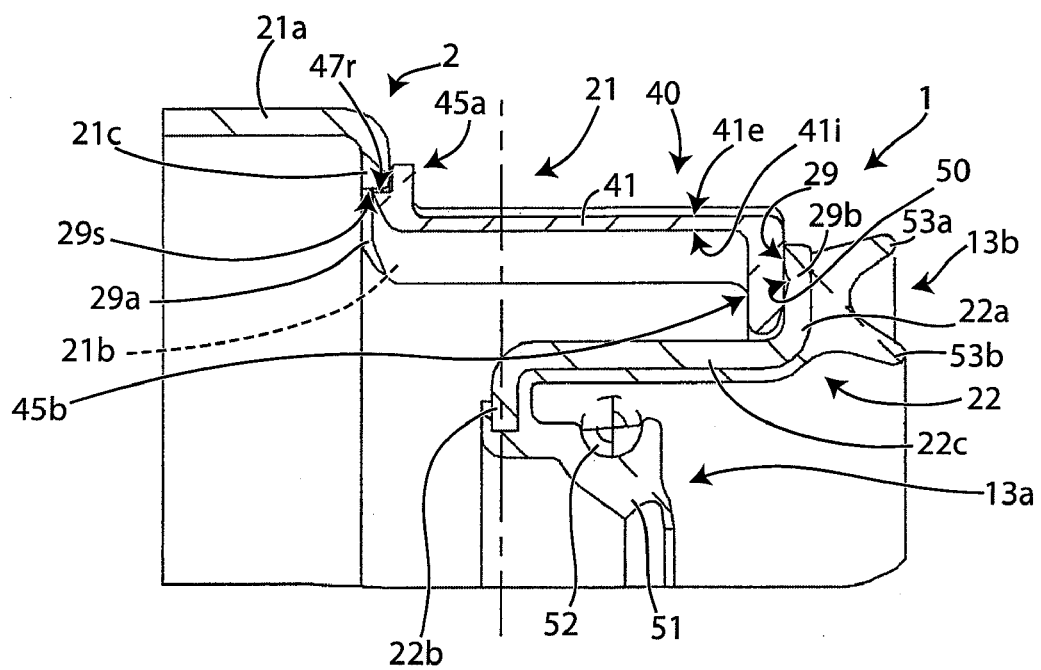
FIG. 2 illustrates, in axial section and with some parts removed for reasons of clarity, and on an enlarged scale, a detail which is shown in FIG. 1.

As is better illustrated in FIG. 2, the shield 2 is made of metallic material, and comprises a cylindrical lateral wall 21 which is integral with the race 11, and a frontal shaped wall 22, which is integral with the wall 21, and which axially folds inside the cylindrical lateral wall 21 itself in order to further protect the encoder 16 and to support the sealing element 13a.

In particular, the wall 21 comprises two cylindrical portions 21a and 21b, and an annular portion 21c, of which: the portion 21a is shrink fit onto the race 11; the portion 21b is radially interposed between the encoder 15 and the sensor 17, and presents a diameter D2 with dimensions which are less than a diameter D1 of the portion 21a; and the portion 21c is arranged transverse to the axis A, and is connected to both the portions 21a and 21b in order to render the portions 21a and 21b themselves integral in relation to each other.

The wall 22 comprises, instead, two annular portions 22a and 22b, and a cylindrical portion 22c, of which: the annular portion 22a is arranged transverse to the axis A and is connected to the portion 21b; the portion 22b is parallel to the portion 22a and directly supports the lip 13a; and the portion 22c is radially arranged opposite the encoder 16 itself in relation to the portion 21b and is connected to both the portions 22a and 22b in order to render the portions 22a and 22b themselves integral in relation to each other.

In addition, the cylindrical lateral wall 21 is provided with a passing window 29 which is obtained through the portion 21b in order to permit the sensor 17 to face the encoder 16 without undergoing any interference from any metallic material. The window 29 extends in an arc of limited width along the portion 21b defining, on the portion 21b itself, two sides 21c which are parallel to the axis, and is axially delimited by two sides 29a and 29b which are transverse to the axis A and contiguous with the sides 29c, and of which the side 29a is defined by a semi-circular part of the portion 29c, while the side 29b is defined by a semi-circular part of the portion 22a. As the window 29 also extends through a part of the portion 21c, the side 29a is, in addition, radially delimited towards the inside by a cylindrical surface 29s.

As is better illustrated in FIG. 3, the sealing device 1 comprises, in addition, a cover 40, which is made of plastic material with a rigid structure, and which is arranged in such a way as to close the window 29, and is selectively mobile due to the effect of the variations in pressure between the inside and outside of the bearing 12 between a first extreme operating position, in which it is suitable for substantially sealing the window 19, and a second extreme operating position, in which it is radially raised by the window 19 in order to permit communication between the inside and outside of the bearing 12 for the time necessary to restore an equilibrium of the pressure between the inside and outside of the bearing 12 itself without permitting, however, the escape of any lubricating grease or the infiltration of any impurities.

The cover 40 comprises a central body 41 which is shrink fit onto the window 19 itself, and two lateral flaps 42, which are integral with the body 41 and which extend in a direction which is circumferentially opposite the body 41 itself, and which each present an outline which matches an outline of the portion 21b of the cylindrical lateral wall 21 in order to be arranged in contact with the cylindrical lateral wall 21 itself when it is in its operating position.

The central body 40 is defined by a plastic sheet 41a of an extremely reduced thickness which is less than a thickness of the flaps 42, and by two opposite borders 41b, each of which is arranged parallel to the axis A, and presents a thickness which is substantially double that of the thickness of the sheet 41a. The sheet 41a presents an arched shape in order to be arranged directly in an intermediate position between the sensor 17 and the encoder 16, and is radially delimited by a lower cylindrical surface 41i and an upper cylindrical surface 41e, of which the surface 41i extends from one border 41b to the other, while the surface 41e is connected to the flaps 42.

Each border 41b forms with the relative flap 42 a respective step 43, which is arranged radially inside the relative flap 42, and presents a height which is substantially equal to a thickness of the portion 21b in such a way as to be able to exactly face a relative border 29c in the first operating position.

The cover 40 comprises, in addition, two longitudinal borders 45a and 45b, which are arranged transverse to the borders 41b in order to be engaged in such a way as to seal the sides 29a and, respectively, 29b, and of which the border 45a departs from the body 41 radially towards the outside, while the border 45b departs from the body 41 radially towards the inside.

The border 45a delimits the body 41 axially towards the inside of the device 1, and extends between the two steps 43 in such a way as to engage and seal, as has already been explained, the side 29a of the window 29. In particular, the border 45a is radially delimited towards the inside by a conical surface 46 which is connected to the surface 41i, and presents a lateral housing 47, which is axially open towards the inside and radially towards the outside of the device 1, and is engaged by the side 29a in such a way that an own radial cylindrical surface 47r faces the surface 29s, and an own axial surface 47a is arranged in such a way as to abut the portion 21c.

The border 45b delimits the body 41 axially towards the outside of the device 1, and extends between the two steps 43 in such a way as to engage and seal, as has already been explained, the side 29b of the window 29. In particular, the border 45b is axially arranged in such a way as to abut the portion 22a, and is axially delimited towards the outside of the device 1 by an annular surface 48 which is arranged substantially in contact with the portion 22a from which departs a domed moulding 49 which is inserted in an undetachable fashion inside a groove 50 which is obtained along the border 29b.

The conformation of the borders 45a and 45b permits the cover 40 to be snap inserted inside the window 29, and determines a radial course of the cover 40 itself. In particular, the cover 40 is mounted by initially engaging the border 45a with the border 29a of the window 29 and, subsequently, by forcing the border 45b against the border 29b until the moulding 49 is inserted into the groove 50, which presents an internal curvature radius that is such as to leave and define a margin of freedom and radial movement for the moulding 49 itself.

After assembly, the surface 47r faces the surface 29s which functions as the end of a course of the radial movement of the cover 40 equal to the coupling between the moulding 49 and the groove 50, which, as well as increasing the lateral seal of the cover 40, also guarantees the blocking of the cover 40 itself.

Due to the different pressure conditions between the inside and outside of the device 1, the cover 40 may be arranged in its first operating position, in which it is arranged inside the window 29 with the flaps 42 arranged in contact with the portion 21b, or, in the case of an occurrence of excess pressure inside the bearing 12 and the device 1, it may be arranged in its second operating position, in which the flaps 42 are detached from the portion 21b in such a way as to permit communication between the inside and outside of the bearing 12.

It should also be underlined that, in the first operating position, the sealing capacity of the cover 40 is guaranteed both by the presence of the steps 43, which are arranged in substantial contact with the borders 29c, and by the contact of the surface 47a with the border 29a and the surface 48 with the border 29b: the contacts which have just been described function as an equal number of labyrinth seals between the cover 40 and the window 29 in such a way as to guarantee optimal sealing conditions for the device 1.

In addition, the lateral seal of the cover 40, or rather the seal along the borders 45a and 45b, does not vary in a substantial way in relation to any variations in the position of the cover 40 itself.

As the cover 40 presents a rigid structure, and is made of plastic material, it creates two further advantages in relation to the use of the membrane 20 which was described in the introduction. In the first place, it permits the definition in certain fashion of the excursion of the course of the cover 40, and, in the second place, it makes it possible to avoid that a covering 20' of rubber material be used to completely cover the shield 10, instead limiting such a covering 20' only to the areas which concern the elements 13a and 13b, the first of which, with reference to FIG. 2, is defined by a sealing lip 51 which is provided with an internal elastic element 52, while the second of which comprises two conical lips 53a and 53b, which axially protrude towards the outside of the device 1 starting from the portion 22a, and which present opposing tapering characteristics. The lips 53a and 53b are suitable for being arranged in contact with an external shoulder (which is not illustrated) in order to create a seal on the external shoulder itself.

It is obvious from the above description that the adoption of the cover 40 does not only permit the resolution of any problems which may be encountered in relation to the use of the membrane 20 guaranteeing a long working life to the bearing 12, but also permits the optimisation of the production of the sealing device 1 itself with notable savings in terms of the materials used, as well as in production times.

It is intended that the present invention should not be limited to the forms of embodiment which are herein described and illustrated, which are to be considered as examples of forms of embodiment of a sealing device for rolling contact bearings, and which may instead be subject to further modifications relating to the shape and disposition of the parts, as well as to details pertaining to construction and assembly.

The invention claimed is:

1. Sealing device for rolling contact bearings comprising:
   a shield installed onto an outer race of the bearing, and presenting a lateral cylindrical wall which is suitable for being arranged in an intermediate position between an encoder and a reading sensor of the bearing; and
   a passing window through the lateral cylindrical wall to permit the sensor to face the encoder; and
   a rigid cover shrink fit into the window, wherein the cover is selectively movable to vary pressure between the inside and the outside of the bearing between two extreme operating positions, wherein in at least one of the extreme operating positions, the cover substantially seals the window.

2. Sealing device according to claim 1, wherein said cover is made of plastic material.

3. Sealing device for rolling contact bearings comprising:
   a shield installed onto an outer race of the bearing, and presenting a lateral cylindrical wall which is suitable for being arranged in an intermediate position between an encoder and a reading sensor of the bearing;
   a passing window through the lateral cylindrical wall to permit the sensor to face the encoder; and
   a cover selectively movable to vary pressure between the inside and the outside of the bearing between two extreme operating positions, the cover comprising:
   a central body shrink fit into the window, and
   two lateral flaps extending in a direction opposite the central body, wherein the lateral flaps have a respective profile matching a profile of the lateral cylindrical wall to overlap the lateral cylindrical wall in at least one of the two extreme operating positions;
   wherein in at least one of the extreme operating positions, the cover substantially seals the window.

4. Sealing device according to claim 3, wherein the cover comprises a first longitudinal border engaged in sealing fashion with a respective first longitudinal side of the window, and wherein the first longitudinal border defines an end cycle element for at least one of the two extreme operating positions.

5. Sealing device according to claim 4, wherein the first longitudinal border has cylindrical arrest surface, and an annular sealing surface transverse to the arrest surface and arranged substantially in contact with the first longitudinal side to run in a radial direction in contact with the first longitudinal side.

6. Sealing device according to claim 5, wherein the cover comprises a second longitudinal border abutting a second respective longitudinal side of the window, wherein the second longitudinal border includes a mobile blocking molding inside a groove in the second longitudinal side.

7. Sealing device according to claim 6, wherein for each flap, said cover comprises a respective step counter facing a respective axial side of the window to create a seal with the relative axial side.

* * * * *